(12) United States Patent
Shinoda et al.

(10) Patent No.: US 6,428,932 B1
(45) Date of Patent: Aug. 6, 2002

(54) ZINC ALLOY POWDER AND ALKALINE BATTERY USING THE SAME

(75) Inventors: Mitsuo Shinoda; Keiichi Kagawa; Seiji Fuchino; Kouji Morita; Yoshiaki Tanino; Makoto Matsuo; Akira Oyama, all of Shimonoseki (JP)

(73) Assignee: Mitsui Mining & Smelting Company, Ltd. (JP)

( * ) Notice: Subject to any disclaimer, the term of this patent is extended or adjusted under 35 U.S.C. 154(b) by 0 days.

(21) Appl. No.: 09/574,957

(22) Filed: May 19, 2000

(30) Foreign Application Priority Data

May 21, 1999 (JP) .............................. 11-141723
Jul. 22, 1999 (JP) .............................. 11-207319

(51) Int. Cl.⁷ ................................. H01M 4/24
(52) U.S. Cl. ..................... 429/229; 429/218.1
(58) Field of Search ................ 429/218.1, 229

(56) References Cited

U.S. PATENT DOCUMENTS 4,851,309 A * 7/1989 Toyoguchi et al. ......... 429/194
4,994,333 A * 2/1991 Jose et al. ................. 429/190
5,645,611 A * 7/1997 Ekern et al. ................ 29/623.2
6,022,639 A * 2/2000 Urry .......................... 429/229

FOREIGN PATENT DOCUMENTS

| EP | 0377106 | 7/1990 |
| WO | 9607765 | 3/1996 |

OTHER PUBLICATIONS

Patent Abstracts of Japan, 05182660, Jul. 23, 1993 (1 page).
Patent Abstracts of Japan, 09270254, Oct. 14, 1997 (1 page).

* cited by examiner

Primary Examiner—Gabrielle Brouillette
Assistant Examiner—M. Wills
(74) Attorney, Agent, or Firm—Bierman, Muserlian and Lucas

(57) ABSTRACT

Zinc alloy powder for alkaline batteries containing Bi at a rate of 0.01–0.1% by weight, In at a rate of 0.01–0.1% by weight, Mg at a rate of 0.0005–0.03 % by weight and unavoidable impurities, such as Pb, Cd and Cu, capable of improving high-rate performance and being suitable for using as a cathode active substance for alkaline batteries is provided.

8 Claims, 6 Drawing Sheets

Correlation between tap density and discharge sustained time at 1500 mA.

Correlation between tap density and discharge sustained time under 10 Ω resin trance.

Microscopic photographs showing shapes of particles of zinc alloy powder prepared in different examples. Comparison on shapes (Comparison on SEM photos)

(A) Reference example 2

× 50

× 200

(B) Reference example 3

× 50

× 200

(C) Example 6

× 50

× 200

(D) Example 7

× 50

× 200

ZINC ALLOY POWDER AND ALKALINE BATTERY USING THE SAME

BACKGROUND ART

In the past, the particles of zinc and zinc alloy which are prepared by employing atomizing method (air atomizing) have a size passing through 35–200 mesh and are formed in a potato shape.

When using such zinc and zinc alloy as a cathode active substance for alkaline batteries and filling it up into a battery, contact degree between the particles greatly influence on discharging performance of a battery.

In general, it is said that it is better to increase the surface area of zinc alloy power particles for obtaining better discharging performance, however, along with the increase of the surface area, generation of hydrogen gas due to self-discharge tends to be increased.

In order to increase the surface area of zinc alloy powder particles, a means to form the particles in a flat shape and to reduce the smoothness of the surface of the particles can be applied, however, it is presently an only way to prepare the particles into a smaller size.

Anyway, zinc alloy powder for alkaline batteries, which generates greater contact degree between the particles and generate less hydrogen gas due to self-discharge, has not been found so far.

It is an object of the present invention to provide zinc alloy powder for alkaline batteries, of which discharging performance having been improved, being suitable to use as a cathode active substance for alkaline batteries, of which particles being prepared into a flat shape and of which particles having surface with less smoothness, for aiming at improving battery performance, particularly high-rate performance.

BRIEF EXPLANATION FOR DRAWINGS

DISCLOSURE OF THE INVENTION

Figure 1A:
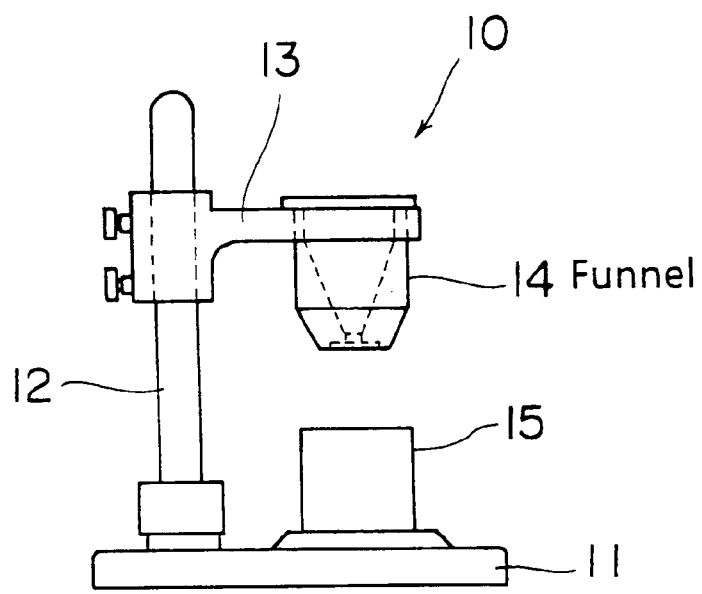
FIGS. 1A and 1B are outlined diagrams for a measuring instrument for determining time required for falling down of zinc alloy powder from a funnel to a reciever.

For solving the problem described above, there is provided a zinc alloy powder for alkaline batteries containing Bi at a rate of 0.01–0.1% by weight, In at a rate of 0.01–0.1% by weight, Mg at a rate of 0.0005–0.03% by weight and unavoidable impurities, such as Pb, Cd and Cu.

Preferably, zinc alloy powder is one wherein the tap density of the alloy powder is in a range of 2.9–3.3 g/cm$^3$.

Also preferably, the zinc alloy powder is one wherein each of the particles of the zinc alloy powder appears to be a flat shape.

The zinc alloy powder is one wherein temperature of the hot melt of the zinc alloy under atomizing method is set to a range of from 430 to 530° C.

The powdered zinc alloy for alkaline batteries contains Bi at a rate of 0.01–0.1% by weight, In at rate of 0.01–0.1% by weight, Mg at a rate of 0.0005–0.03% by weight, Pb at a rate of 0.001–0.1% by weight, one or more at a total rate of 0.0001–0.1% by weight selected from Al, Ca and Sn, and unavoidable impurities, such as Cd and Cu.

Claim 6 is directed to the zinc alloy powder for alkaline batteries the zinc alloy powder containing lead and tin for alkaline batteries has a tap density of the zinc alloy powder is in a range of 2.9–3.3 g/cm$^3$.

The zinc alloy powder for alkaline batteries containing lead and tin is preferably a powder wherein each of the particles of the zinc alloy powder appears to be a flat shape.

The zinc alloy powder for alkaline batteries containing lead and tin is preferably prepared at a temperature of the hot melt of the zinc alloy to be employed under atomizing method is set to a range of from 430 to 460° C.

The zinc allow powder for alkaline batteries of the invention is one wherein the zinc alloy powder is used as a cathode active substance in an alkaline battery.

BEST MODES FOR CARRYING OUT THE INVENTION

Now, the embodiments for carrying out the present invention is further explained in detail, however, it should be construed that the scope of the present invention should not be limited to the description in the examples written below.

The cathode active substance for an alkaline battery according to the present invention is composed of zinc alloy powder containing Bi at a rate of 0.01–0.1% by weight, In at a rate of 0.01–0.1% by weight, Mg at a rate of 0.0005–0.03% by weight and unavoidable impurities, such as Pb, Cd and Cu.

Alternatively, such cathode active substance for an alkaline battery may be replaced with the other substance which contains Bi at a rate of 0.01–0.1% by weight, In at a rate of 0.01–0.1% by weight, Mg at a rate of 0.0005–0.03% by weight, Pb at a rate of 0.001–0.1% by weight and one or more at a total rate of 0.0001–0.1% by weight selected from Al, Ca and Sn.

Although it is described above that the cathode active substance for an alkaline battery contains Bi at a rate of 0.01–0.1% by weight, In at a rate of 0.01–0.1% by weight and Mg at a rate of 0.0005–0.03% by weight, however, it is more preferable that the cathode active substance contains Bi at a rate of 0.04–0.06% by weight, In at a rate of 0.04–0.06% by weight and Mg at a rate of 0.005–0.025% by weight.

As shown in Table 1 in the example described below, this is due to a reason that generation of hydrogen gas tend to be increased when the amount of Mg is increased too much, and both Bi and In show to have a prominent effect to suppress the generation of hydrogen gas at the content ranges as described above.

In the present invention, the tap density of the zinc alloy powder greatly varies depending upon the amount of metal elements being added, which are Bi and Mg, and it is suitable to fix the tap density in a range of 2.9–3.3 g/cm³.

In order to fix in the above range, it is essential to contain Bi and Mg in the zinc alloy powder.

Whereas, as indicated in the example described later, it is important to set the temperature of the hot melt of the zinc alloy under the atomizing method to a range of from 430 to 530° C. so as to maintain the tap density in a range as described above.

In case that the zinc alloy powder contains Pb at a rate of 0.001–0.1% by weight and any one or more selected from Al, Ca and Sn at a total rate of 0.0001–0.1% by weight, the tap density of the zinc alloy powder can be adjusted to a range described above by maintaining the temperature of the hot melt of the zinc alloy powder under the atomizing method to a range of from 430 to 460° C. as specified in the example described below.

In the present invention, addition of Bi and Mg in a fixed combining rate allows to make the appearance of the particles of the zinc alloy powder in a flat form and reduce the smoothness on the surface of the zinc alloy powder particles.

If representing the time required for completing the falling down of the alloy powder as a parameter indicative for the appearance of the particles and the smoothness on the surface of the zinc alloy powder, it is in a range of from 19 to 22 seconds.

Figure 6:
FIG. 6 is microscopic photographs (copies) showing the appearance of the particles of zinc alloy powder.
Figure 6:
Figure 6:
Figure 6:
Figure 6:
Figure 6:
Figure 6:
Figure 6:

Further, as clearly demonstrated on SEM photos shown in the example described below (see FIG. 6), the appearance of the particles of the zinc alloy powder is recognized as being a flat shape.

Now, an apparatus and a method to measure time required for completing the falling down of the zinc alloy powder particles from a funnel to a receiver which is indicative for the degree of a flat shape of the particles are explained.

Figure 1B:
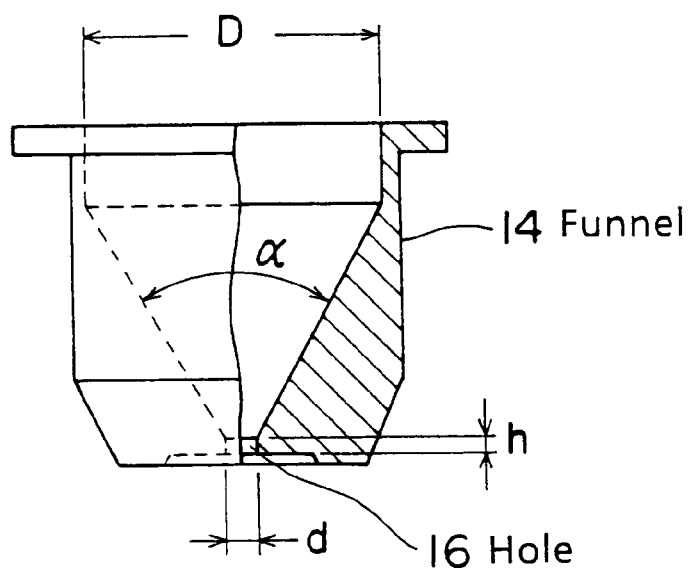

A measuring instrument 10 for measuring time required for completing the falling down of the zinc alloy powder particles is shown in FIG. 1, wherein a vertically-movable funnel support 13 is arranged onto a supporting bar 12 which is fixed on a supporting stand 11, and a funnel 14 is held on the funnel support 13. As example for such measuring instrument, it is possible to use a measuring instrument for measuring bulk specific gravity specified in JIS J 2504.

The funnel 14 is in a conic form having an internal angle (α) of 60° (±0.3°), the diameter of its upper open part (D) is 50 mm and the diameter of its outlet hole (d) is 5 mm (+0.02), and the height of the outlet hole (h) is 5.7 mm.

A fixed-amount of the zinc alloy powder was put into the funnel 13 and the time required for completing the falling down of the zinc alloy powder in a whole amount from the exit of the funnel 13 to a receiver 15 was measured. The material used for the funnel 14 here is stainless steel.

Now, procedure for measuring the time required for completing the falling down of the zinc alloy powder is explained hereinbelow.

1) Using the measuring instrument 10 (Diameter of upper open part of a funnel (D) 50 mm; Diameter of outlet hole of a funnel: 5 mm), 100 g of the zinc alloy powder was put into a funnel 13 while blocking the hole 16 by using a finger.
2) To start counting time required for completing falling down of the zinc alloy powder in a whole amount from a funnel to a receiver 15 by using a stopwatch simultaneously at removing the finger from the exit of the hole 16 which blocked the hole 16.
3) To express the smoothness of the zinc alloy powder with values based on the measured-time required for completing the falling down through a funnel 13.

Therefore, the difference in the shape of the particles of the zinc alloy powder can be determined by putting 100 g zinc alloy powder into a funnel and measuring the time required for completing the falling down of the zinc alloy powder in a whole amount through a conic funnel, of which internal angle (α) is 60°, the diameter of its upper open part (D) being 50 mm, the diameter of its outlet hole (d) being 5 mm, and the height of its outlet hole (h) being 5.7 mm.

The zinc alloy powder particles being prepared in a flat shape and of which surface smoothness being reduced increase both contact degree and sliding resistance between the particles, which therefore makes the time required for completing the falling down longer.

It is understood that such particles of the zinc alloy powder, which require longer time for completing the falling down and of which surface smoothness being reduced, can improve battery performance, particularly high-rate performance, as a result that the contact degree between the particles of those particles being increased and resistance at discharging getting lower.

In the present invention, as shown in the examples described below, the objective zinc alloy powder, which can be used as a cathode active substance for alkaline batteries, can be obtained by adding specific metals into the zinc alloy powder at a specific content range, respectively, and by producing the hot melt of the zinc alloy at a temperature range described above.

EXAMPLES

Now, an example for explaining a preferable embodiment for carrying out the present invention is described in the following, however, it should be understood that the scope of the present invention shall not be limited to the one described in the following example.

Zinc alloy powder for alkaline batteries was prepared by subjecting the hot melt of the zinc alloy having a composition as shown below in Table 2 and being maintained at a temperature in a range of from 430 to 560° C. to an air atomizing process.

Then, an alkaline manganese battery was prepared by using the zinc alloy powder as a cathode substance for alkaline batteries.

Hydrogen gas generation test was carried out by using the zinc alloy powder obtained as described above, and the result thereof is presented in Table 1.

In Table 1, the results of Examples 3, 7 and 12 and those of Reference Examples 6 and 9, which are shown in Table 2, are shown.

The hydrogen gas generation test was carried out by measuring gas generation rate ($\mu$/g·d) at 450° C. during 3 days by using an electrolysis solution in a volume of 5 ml prepared by adding 40% by weight solution of potassium hydroxide saturated with zinc oxide and zinc alloy powder in an amount of 10 g.

TABLE 1

|  | Reference Example 6 | Example 3 | Example 7 | Example 12 | Reference Example 9 |
|---|---|---|---|---|---|
| Zn-Bi500 In500 Amount of Mg Added (% by weight) | 0.0000 | 0.0050 | 0.0100 | 0.0250 | 0.0500 |
| Gas Generating Rate ($\mu$l/g · d) | 1.2 | 0.8 | 3.0 | 4.9 | 14.5 |

Figure 2:
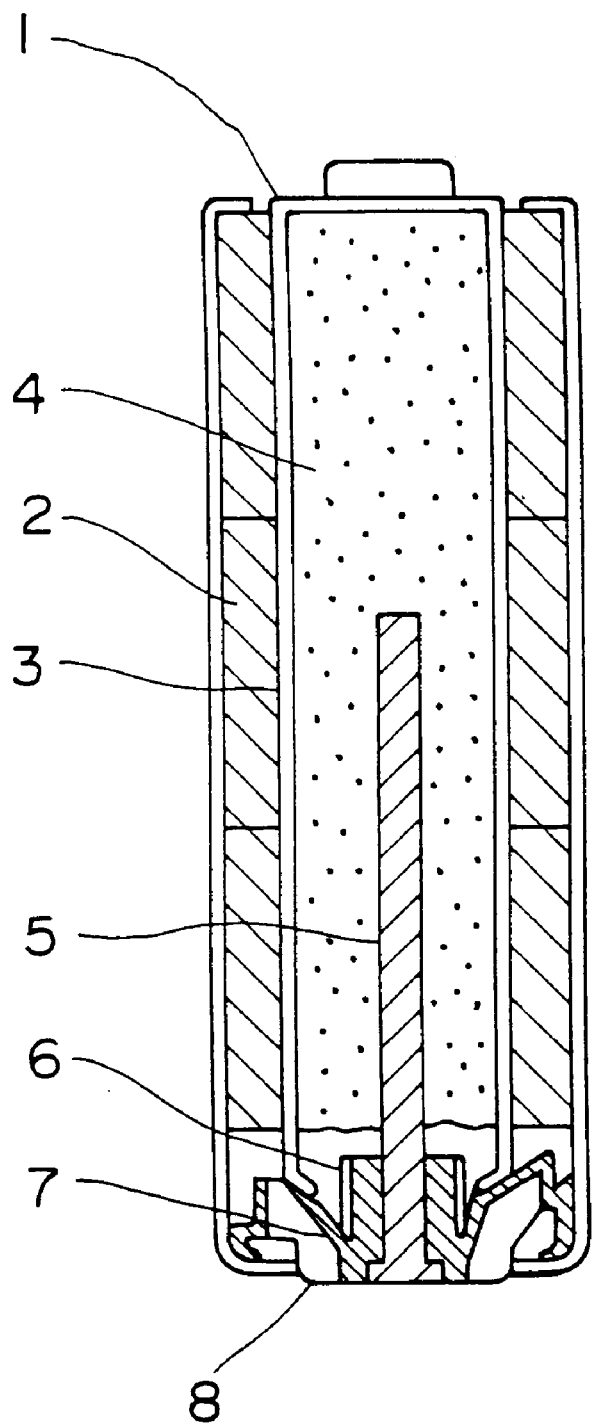
FIG. 2 is a cross section diagram of an alkaline manganese battery.
Figure 3:
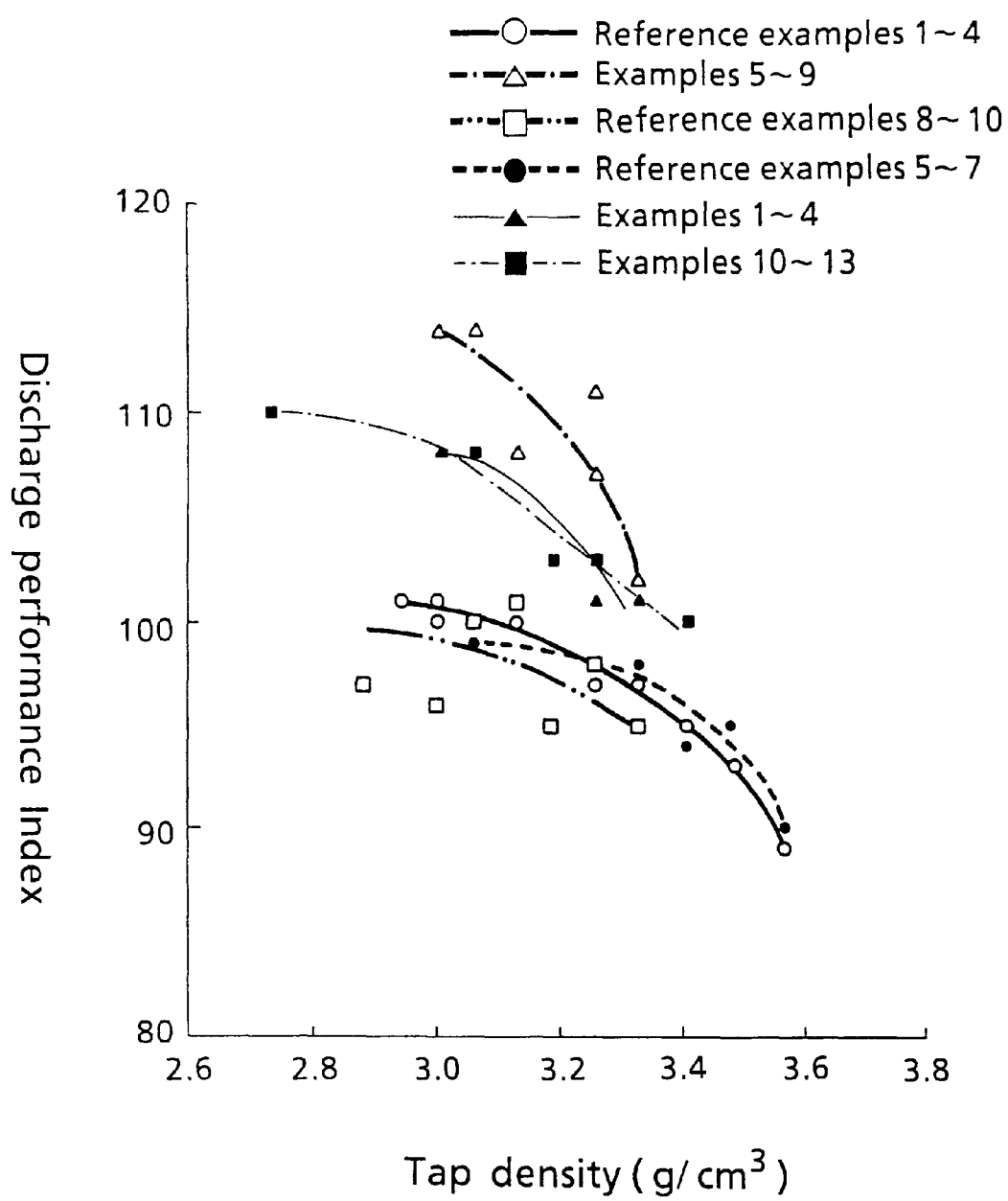
FIG. 3 is a correlation chart between tap density and discharge sustained time at 1500 mA.
Figure 4:
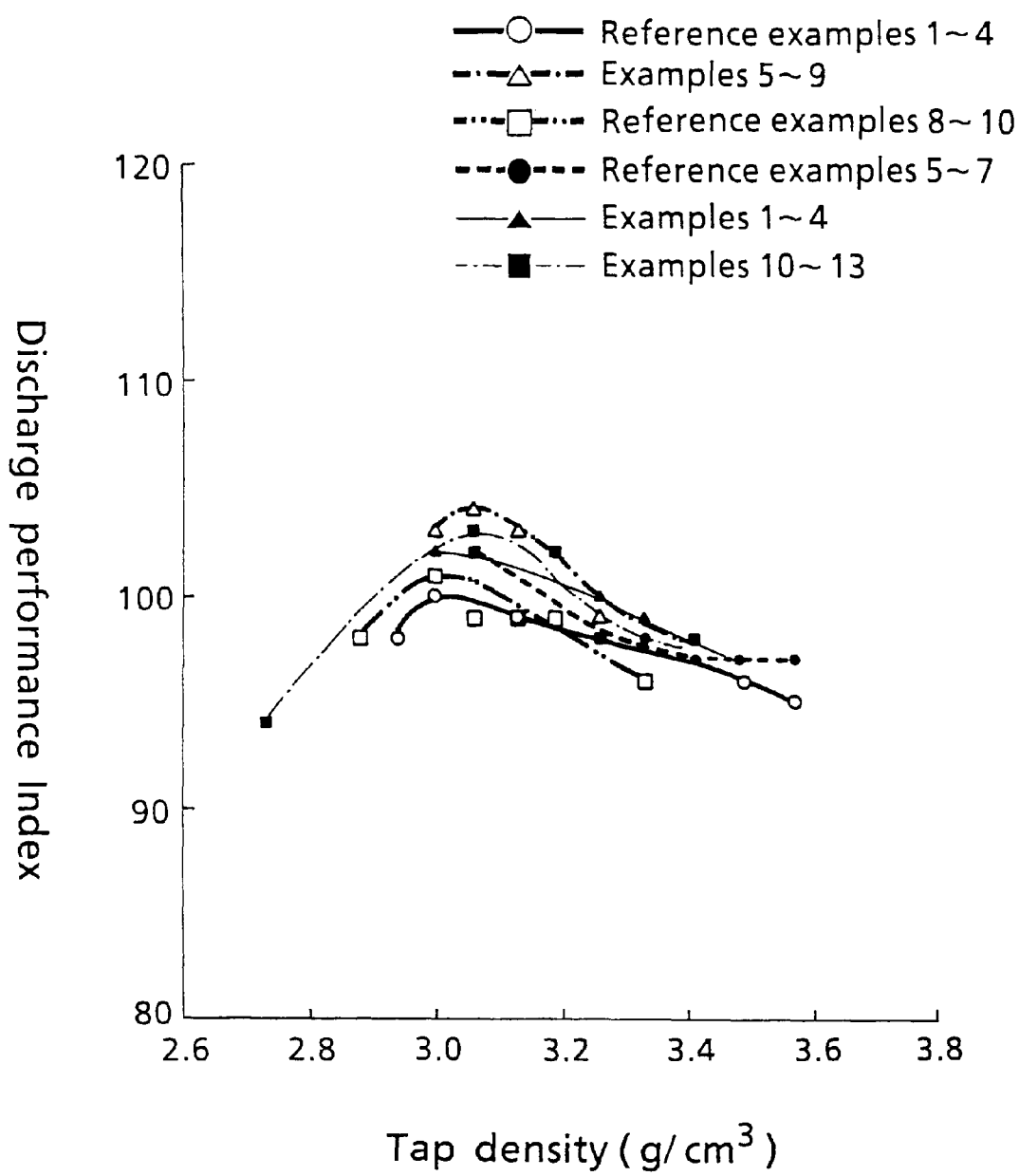
FIG. 4 is a correlation chart between tap density and discharge sustained time at 10 Ω resistance.

The performance of a battery was evaluated by using the alkaline manganese battery shown in FIG. 2, which is using the zinc alloy powder as a cathode substance.

The alkaline manganese battery shown in FIG. 2 is constituted with an anode 2 being provided inside of an anode case 1, a separator 3, a cathode 4 prepared with zinc alloy powder being geled with sodium polyacrylate, a cathode collector 5 for the cathode, a closing cap 6, a gasket 7 and a cathode terminal 8.

Discharge sustained time until the final voltage of 0.9V was measured by using the alkaline manganese battery under discharging conditions of using a discharge electrode of 10 $\Omega$ at 20° C. and 1500 mA at 20° C., and the measured-time was expressed as a relative index when the measured value obtained from the battery of Reference Example 3, where conventional cathode substance is used, is fixed to a value of 100.

The results are shown in Tables 2 and 3.

TABLE 2

|  | Composition Example of Alloy (ppm) | | | | Temp of Hot Melt (° C.) | Tap Density | Falling Time (Sec.) | Gas Generation Rate ($\mu$l/g·d) | Relative Index for 1500 mA Discharge Sustained Time | Relative Index for 10 $\Omega$ Discharge Sustained Time |
|---|---|---|---|---|---|---|---|---|---|---|
|  | Al | Bi | In | Mg |  |  |  |  |  |  |
| Reference Example 1 | 50 | 500 | 500 | — | 430 | 2.94 | 21.7 | 3.2 | 101 | 98 |
| Reference Example 2 | 50 | 500 | 500 | — | 460 | 3.00 | 19.0 | 2.0 | 101 | 100 |
| Reference Example 3 | 50 | 500 | 500 | — | 500 | 3.13 | 18.8 | 1.4 | 100 | 100 |
| Reference Example 4 | 50 | 500 | 500 | — | 530 | 3.49 | 17.6 | 2.0 | 93 | 96 |
| Reference Example 5 | — | 500 | 500 | — | 460 | 3.06 | 22.1 | 2.4 | 99 | 102 |
| Reference Example 6 | — | 500 | 500 | — | 500 | 3.41 | 19.1 | 1.2 | 90 | 97 |
| Reference Example 7 | — | 500 | 500 | — | 530 | 3.41 | 17.9 | 1.4 | 94 | 97 |
| Example 1 | — | 500 | 500 | 50 | 430 | 3.00 | 21.2 | 1.7 | 108 | 102 |
| Example 2 | — | 500 | 500 | 50 | 460 | 3.06 | 18.1 | 1.7 | 101 | 99 |
| Example 3 | — | 500 | 500 | 50 | 500 | 3.33 | 19.2 | 0.8 | 98 | 97 |
| Example 4 | — | 500 | 500 | 50 | 530 | 3.33 | 17.8 | 1.5 | 101 | 99 |
| Example 5 | — | 500 | 500 | 100 | 430 | 3.00 | 20.6 | 2.9 | 114 | 103 |
| Example 6 | — | 500 | 500 | 100 | 460 | 3.06 | 19.5 | 2.2 | 114 | 104 |
| Example 7 | — | 500 | 500 | 100 | 500 | 3.26 | 18.6 | 3.0 | 111 | 99 |
| Example 8 | — | 500 | 500 | 100 | 530 | 3.41 | 17.2 | 1.9 | 100 | 98 |
| Example 9 | — | 500 | 500 | 100 | 560 | 3.41 | 17.6 | 1.8 | 100 | 98 |
| Example 10 | — | 500 | 500 | 250 | 430 | 2.73 | 21.5 | 4.9 | 110 | 94 |
| Example 11 | — | 500 | 500 | 250 | 460 | 3.00 | 20.5 | 5.0 | 108 | 103 |
| Example 12 | — | 500 | 500 | 250 | 500 | 3.19 | 18.3 | 4.9 | 103 | 102 |
| Example 13 | — | 500 | 500 | 250 | 530 | 3.26 | 18.7 | 5.2 | 103 | 98 |
| Reference Example 8 | — | 500 | 500 | 500 | 460 | 2.88 | 20.2 | 16.1 | 97 | 98 |
| Reference Example 9 | — | 500 | 500 | 500 | 500 | 3.06 | 19.9 | 14.5 | 100 | 99 |
| Reference Example 10 | — | 500 | 500 | 500 | 530 | 3.19 | 19.4 | 9.5 | 95 | 99 |

TABLE 3

| | Composition Example of Alloy (ppm) | | | | | | Temp of Hot Melt (° C.) | Tap Density | Falling Time (Sec.) | Gas Generation Rate µl/g.d | *1 Time | *2 Time |
|---|---|---|---|---|---|---|---|---|---|---|---|---|---|
| | Al | Bi | In | Mg | Pb | Ca | Sn | | | | | | |
| Ref. Ex. 14 | — | 500 | 500 | 100 | 500 | — | — | 460 | 3.06 | 19.5 | 1.2 | 117 | 102 |
| Ref. Ex. 15 | 50 | 500 | 500 | 100 | — | — | — | 460 | 3.10 | 19.7 | 1.4 | 114 | 103 |
| Ref. Ex. 16 | — | 500 | 500 | 100 | — | 130 | — | 460 | 3.10 | 19.2 | 1.5 | 111 | 102 |
| Ref. Ex. 17 | — | 500 | 500 | 100 | — | — | 500 | 460 | 3.10 | 18.8 | 1.5 | 117 | 100 |

*1:Relative Index for 1500 mA Discharge Sustained Time
*2:Relative Index for 10 Ω Discharge Sustained Time From the results shown in Table 2, it is demonstrated that the zinc alloy powder prepared according to Examples 1 to 4, containing Mg at a concentration of 500 ppm, Bi at 500 ppm and In at 500 ppm, zinc alloy powder according to Examples 5 to 9, containing Mg at 100 ppm, Bi at 500 ppm and In at 500 ppm, and zinc alloy powder prepared according to Examples 10 to 13, containing Mg at 250 ppm, Bi at 500 ppm and In at 500 ppm, have better property in battery performance, especially in high-rate performance (relative index for discharge sustained time at 1500 mA) than the zinc alloy powder prepared according to Reference Examples 1 to 4, which contains Al at 50 ppm, Bi at 500 ppm and In at 500 ppm, the zinc alloy powder prepared according to Reference Examples 5 to 7, which contains Bi at 500 ppm and In at 500 ppm and the zinc alloy powder prepared according to Reference Examples 8 to 10, which contains Mg at 500 ppm, Bi at 500 ppm and In at 500 ppm.

Further, as it is also demonstrated in Table 3, the zinc alloy powder containing Mg at 50 ppm, Bi at 500 ppm and In at 500 ppm and added with Al (50 ppm), Pb (500 ppm), Ca (130 ppm) and Sn (500 ppm), respectively, has excellent property in battery performance, especially in high-rate performance (relative index for discharge sustained time at 1500 mA).

Such excellent properties described above are obvious from the results shown in Table 3, which is a correlation chart between the tap density and the density sustained time at 1500 MA and discharge performance index is defined as the discharge sustained time at 1500 mA when the tap density in Reference Examples 1 to 4 is fixed at 100, respectively, and Table 4, which is a correlation chart between the tap density and the discharge sustained time at 10 Ω resistance and the discharge performance index is defined as the discharge sustained time at 10 Ω resistance when the tap density in Reference Examples 1 to 4 is fixed to 100,respectively.

In particular, the zinc alloy powder prepared in Examples 1, 5, 6, 7, 11, and 14 through 17 showed to have the prominently-higher high-rate performance than a conventional one described in Reference Example 3, and it has been proven that the zinc alloy powder according to the present invention is contributable for improving battery performance for alkaline batteries.

In the present invention, as described above, it is possible to adjust the tap density of the zinc alloy powder by changing the temperature to maintain the hot melt of the zinc alloy.

As obviously shown in the examples described here, the tap density tend to be decreased when the temperature of the hot melt is set at low, while the tap density tends to be increased when the temperature of the hot melt is set at high.

In addition, the tap density varies depending upon the amount of Mg to be added.

As shown in Table 4 presented below, the tap density decreases along with the increase of the amount of Mg added. Though the high-rate performance tend to be improved by means of lowering the tap density, low-rate performance tends to be remarkably diminished when the tap density is set to a range lower than 2.9 g/cm$^3$.

This is because of a reason that the flowing property of the zinc alloy powder becomes extremely low which thereby makes filling of the zinc alloy powder in gel into a cell difficult. Therefore, it is necessary to fix the tap density in a range as specified above.

As shown in Table 2, it is found that the tap density can be adjusted in a range of from 2.9 to 3.3 g/cm$^3$ by means of setting the temperature of the hot melt to a range of from 430 to 460° C. when adding Pb and any one or more selected from Al, Ca and Sn.

TABLE 4

| Composition Example of Alloy (ppm) | | | | | | | Tap Density (g/cm$^3$) of Zinc Alloy Powder at Respective Hot Melt Temperature | | | | |
|---|---|---|---|---|---|---|---|---|---|---|---|
| Bi | In | Mg | Pb | Al | Ca | Sn | 430° C. | 460° C. | 500° C. | 530° C. | 580° C. |
| 500 | 500 | 0 | — | — | — | — | — | 3.06 | 3.41 | 3.41 | — |
| 500 | 500 | 50 | — | — | — | — | 3.00 | 3.06 | 3.33 | 3.33 | — |
| 500 | 500 | 100 | — | — | — | — | 3.00 | 3.06 | 3.26 | 3.41 | 3.41 |
| 500 | 500 | 250 | — | — | — | — | 2.73 | 3.00 | 3.19 | 3.26 | — |

TABLE 4-continued

| Composition Example of Alloy (ppm) | | | | | | | Tap Density (g/cm³) of Zinc Alloy Powder at Respective Hot Melt Temperature | | | | |
|---|---|---|---|---|---|---|---|---|---|---|---|
| Bi | In | Mg | Pb | Al | Ca | Sn | 430° C. | 460° C. | 500° C. | 530° C. | 580° C. |
| 500 | 500 | 500 | — | — | — | — | — | 2.88 | 3.06 | 3.19 | — |
| 500 | 500 | 100 | 500 | — | — | — | — | 3.06 | 3.41 | 3.41 | — |
| 500 | 500 | 100 | — | 50 | — | — | — | 3.10 | 3.41 | 3.41 | — |
| 500 | 500 | 100 | — | — | 130 | — | — | 3.10 | 3.41 | 3.41 | — |
| 500 | 500 | 100 | — | — | — | 500 | 3.00 | 3.10 | 3.33 | 3.33 | — |

Now, the advantageous effect of the present invention is explained by referring microscopic photographs (SEM) of the inventive zinc alloy power.

In the present invention, it is observed that the tap density of the inventive zinc alloy powder being adjusted to a range of from 2.9 to 3.3 g/cm³, that the appearance of the particles of said zinc alloy powder being formed into a flat shape, and that the smoothness on the surface of the particles being reduced.

On the other hand, it is observed that the appearance of the zinc alloys prepared in Reference Examples 2 and 3 are formed in a potato-like shape.

Apparent density has been used as an indicator for expressing an appearance in general, however, tap density, which is a more practical indicator, has been used for the preparation of a cathode for batteries since the zinc alloy is formed in gel and then filled into a cell.

Figure 5:
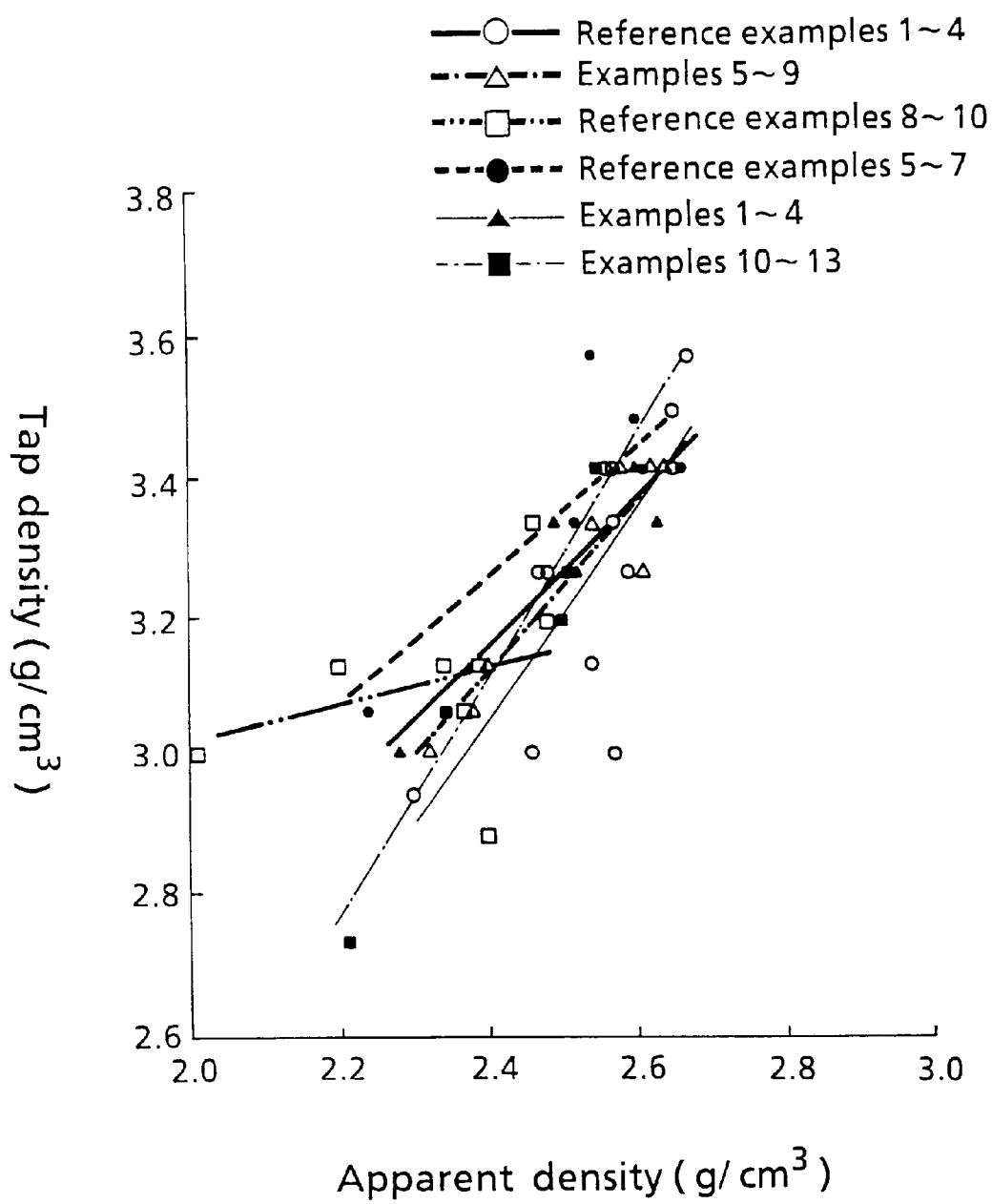
FIG. 5 is a correlation chart between apparent density and tap density.

Further, as shown in FIG. 5, some samples show to have no correlation between the apparent density and the tap density. Therefore, tap density was chosen as the best indicator for expressing an appearance.

Whereas, the appearance of the particles and the smoothness on the surface are expressed by the falling time and that is in a range of from 19 to 22 seconds according to a measuring method as described above.

When the falling time is longer, it can be speculated that the appearance of the zinc alloy particles is in more flat shape and the smoothness on the surface of the particles is becoming less.

Contrary, when the falling time is shorter, it is assumed that the appearance is more round and the smoothness on the surface is increasing.

As described above, the zinc alloy powder having various properties are attainable by providing specific compositions and conditions for the manufacturing.

According to the present invention, it is possible to provide zinc alloy powder which can be suitably used as a cathode active substance for alkaline batteries by means of preparing the appearance of the particles of the zinc alloy powder in a flat shape and decreasing the smoothness on the surface of the particles, in order to improve battery performance, especially high-rate performance.

The entire disclosure of Japanese Patent Application No. 11-141723 filed on 21$^{st}$ May 1999 and Japanese Patent Application No. 11-207319 filed on 22$^{nd}$ Jul. 1999 including specification, claims, drawings and summary are incorporated herein by reference in its entirety.

What is claimed is:

1. Particles of a powdered zinc alloy for alkaline batteries having a tap density of 2.9 to 3.3 g/cm³ and additives selected from the group consisting essentially of 0.01 to 0.1% by weight of bismuth, 0.01 to 1% by weight of indium, 0.0005 to 0.03% by weight of magnesium and impurities, the particles being in a flat shape.

2. The powdered zinc alloy of claim 1 formed by atomization of a hot melt of the zinc alloy at 430° to 530° C.

3. Particles of a powdered zinc alloy for alkaline batteries having additives selected from the group consisting essentially of 0.01 to 0.1% by weight of bismuth, 0.01% to 1% by weight of indium, 0.0005 to 0.3% by weight of magnesium and impurities, 0.0001 to 0.1% by weight of lead and 0.0001 to 0.1% by weight of tin.

4. The powdered zinc alloy of claim 3 having a tap density of 2.9 to 3.3 g/cm³.

5. The powdered zinc alloy of claim 3 wherein the particles are formed in a flat shape.

6. The powdered zinc alloy of claim 3 formed by atomization of a hot melt of the zinc alloy at 430° to 530° C.

7. An alkaline battery containing as the cathode active substance, a powdered zinc alloy of claim 3.

8. An alkaline battery containing as the cathode active substance, a powdered zinc alloy of claim 1.

* * * * *